(12) United States Patent
Kuwajima et al.

(10) Patent No.: US 8,891,043 B2
(45) Date of Patent: Nov. 18, 2014

(54) LIQUID CRYSTAL DISPLAY DEVICE AND METHOD OF MANUFACTURING THE SAME

(75) Inventors: Yuka Kuwajima, Mobara (JP); Eiji Oohira, Mobara (JP)

(73) Assignee: Japan Display Inc., Tokyo (JP)

( * ) Notice: Subject to any disclaimer, the term of this patent is extended or adjusted under 35 U.S.C. 154(b) by 251 days.

(21) Appl. No.: 13/348,690

(22) Filed: Jan. 12, 2012

(65) Prior Publication Data

US 2012/0182488 A1  Jul. 19, 2012

(30) Foreign Application Priority Data

Jan. 19, 2011 (JP) ................................ 2011-008706
Oct. 13, 2011 (JP) ................................ 2011-226113

(51) Int. Cl.
*G02F 1/1335* (2006.01)
*G02F 1/1333* (2006.01)
*G02F 1/1347* (2006.01)
*G02B 27/22* (2006.01)

(52) U.S. Cl.
CPC .......... *G02B 27/2214* (2013.01); *G02F 1/1347* (2013.01); *G02F 1/133528* (2013.01); *G02F 2001/133331* (2013.01); *G02F 2202/28* (2013.01)
USPC .................. 349/96; 349/12; 349/58; 349/60; 349/74

(58) Field of Classification Search
CPC ............ G02F 1/13476; G02F 1/13471; G02F 1/133528; G02B 27/2214
USPC .............. 349/12, 15, 58, 60, 122, 74, 96, 158
See application file for complete search history.

(56) References Cited

U.S. PATENT DOCUMENTS

| 7,847,877 | B2 * | 12/2010 | Nishikawa et al. ............. 349/58 |
| 7,948,575 | B2 * | 5/2011 | Oh et al. .......................... 349/58 |
| 8,411,235 | B1 * | 4/2013 | Barnidge et al. ............. 349/112 |
| 2008/0297685 | A1 * | 12/2008 | Sugibayashi et al. ........... 349/58 |
| 2009/0185088 | A1 * | 7/2009 | Shinohara ........................ 349/12 |
| 2009/0231283 | A1 * | 9/2009 | Polak et al. ................... 345/169 |
| 2010/0177055 | A1 | 7/2010 | Ookawara et al. |
| 2010/0220251 | A1 * | 9/2010 | Park ............................... 349/15 |

FOREIGN PATENT DOCUMENTS

| JP | 2004-294862 | 10/2004 |
| JP | 2010-165032 | 7/2010 |

* cited by examiner

*Primary Examiner* — Nathanael R Briggs
(74) *Attorney, Agent, or Firm* — Antonelli, Terry, Stout & Kraus, LLP.

(57) ABSTRACT

A first panel before attaching at least a polarizing plate on an upper surface thereof is prepared, in order to configure a liquid crystal display panel. A second panel having a polarizing plate at least on one surface is prepared, in order to configure a parallax barrier liquid crystal panel which enables a naked-eye stereoscopic view. An adhesive is interposed between the upper surface of the first panel and the polarizing plate of the second panel. The second panel is larger than the first panel, and the polarizing plate is larger than the first panel. The first panel and the second panel are attached to each other so that the polarizing plate protrudes from the upper surface of the first panel.

18 Claims, 4 Drawing Sheets

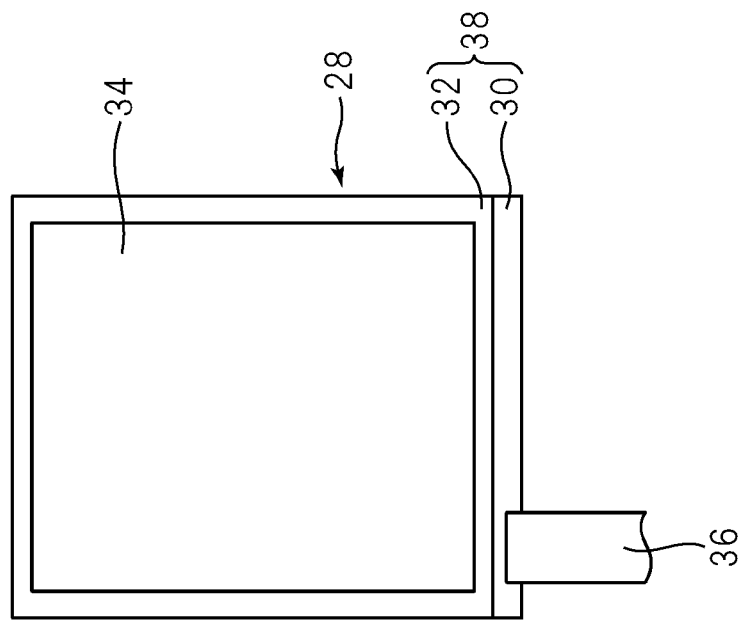
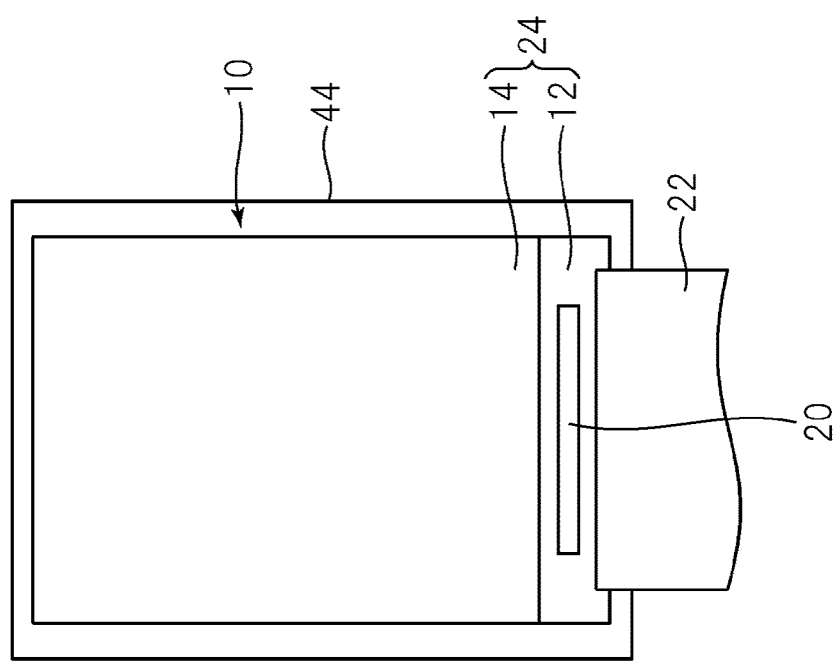

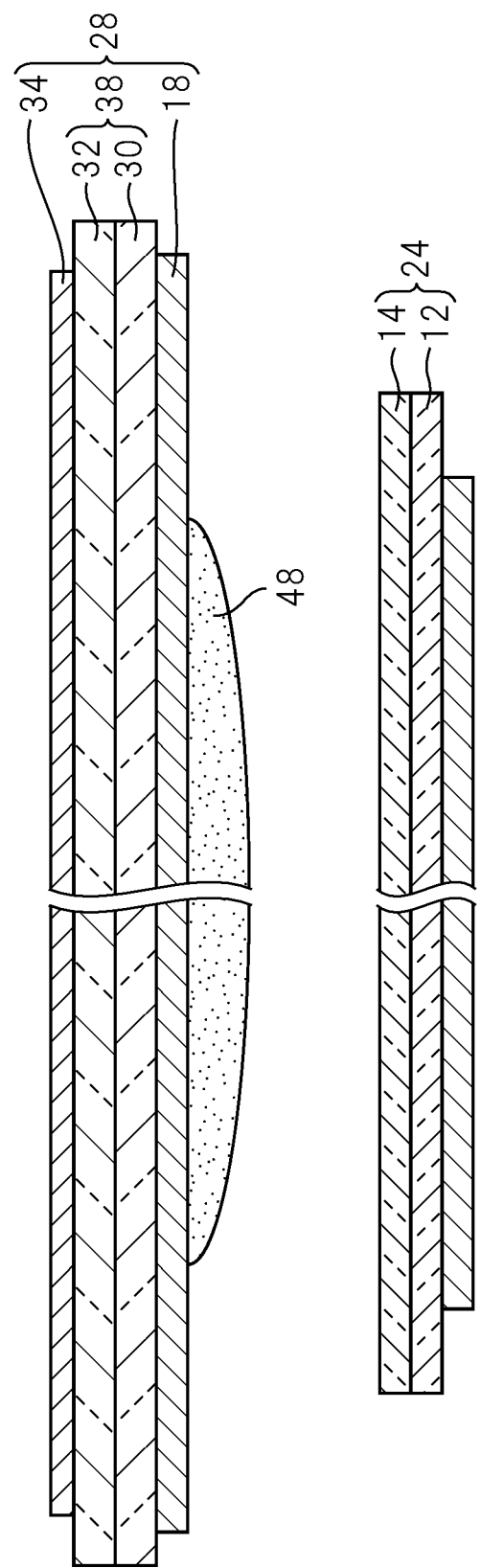

LIQUID CRYSTAL DISPLAY DEVICE AND METHOD OF MANUFACTURING THE SAME

CROSS-REFERENCE TO RELATED APPLICATIONS

The present application claims priorities from Japanese applications JP2011-008706 filed on Jan. 19, 2011 and JP2011-226113 filed on Oct. 13, 2011, the contents of which are hereby incorporated by reference into this application.

BACKGROUND OF THE INVENTION

1. Field of the Invention

The present invention relates to a liquid crystal display device and a method of manufacturing the same.

2. Background Art

In recent years, products which meet the requirements for stereoscopic display of images have been developed, and as small and medium devices such as a mobile phone, or a mobile information terminal, a liquid crystal display device which includes a parallax barrier liquid crystal panel for a naked-eye view has been known (JP2004-294862A). The parallax barrier liquid crystal panel is arranged to be overlapped with a liquid crystal display panel. Specifically, a polarizing plate is attached to the liquid crystal display panel, and the parallax barrier liquid crystal panel is attached to the polarizing plate.

In the related art, when an area (frame) at the periphery of a display area of the liquid crystal display panel is small, it is difficult to attach the polarizing plate so as not to protrude from a glass substrate, and to attach to the entire display area overlappingly.

In addition, there is a case where a side surface of the liquid crystal display panel is used for position aligning. When there is a large variation in an outer shape of the liquid crystal display panel, it is difficult to align the position. For this reason, it is necessary to attach the polarizing plate so as not to protrude to the glass substrate of the liquid crystal display panel. For this reason, the polarizing plate is made smaller than the glass substrate. Meanwhile, if a bonding area between the polarizing plate and the parallax barrier liquid crystal panel is small, it is difficult to secure the bonding strength.

SUMMARY OF THE INVENTION

An object of the present invention is to make an attachment operation of a polarizing plate easy, and preferably, to provide a liquid crystal display device which can secure a wide bonding area of a parallax barrier liquid crystal panel and a liquid crystal display panel, and a method of manufacturing the same.

In a first aspect of the invention, there is provided a method of manufacturing a liquid crystal display device includes, a step of preparing a first panel having a liquid crystal layer for controlling passage and block of light; a step of preparing a second panel to which a polarizing plate which is larger than the first panel is attached to one surface thereof; a step of interposing an adhesive between an upper surface of the first panel and the polarizing plate of the second panel; and a step of bonding the first panel to the second panel by spreading the adhesive, and by making a gap therebetween small. According to the invention, it is possible to perform the bonding work of the polarizing plate easily, since the polarizing plate is larger than the first panel.

In a second aspect of the invention, the method of manufacturing the liquid crystal display device according to the first aspect may be that, the first panel is a part of a liquid crystal display panel which is formed by interposing the liquid crystal layer between a TFT substrate including a thin film transistor and a color filter substrate including a color filter, and the second panel is a part of a parallax barrier liquid crystal panel which enables a naked-eye stereoscopic view by separating a left eye image and a right eye image which are displayed on the liquid crystal display panel.

In a third aspect of the invention, the method of manufacturing the liquid crystal display device according to the first aspect may be that, the first panel is prepared in a state where a third panel is overlapped with a lower surface opposite to the upper surface on which the second panel is attached; one of the first panel and the third panel is a part of a liquid crystal display panel which is formed by interposing the liquid crystal layer between a TFT substrate including a thin film transistor and a color filter substrate including a color filter; and the other of the first panel and the third panel is apart of a parallax barrier liquid crystal panel which enables a naked-eye stereoscopic view by separating a left eye image and a right eye image which are displayed on the liquid crystal display panel.

In a fourth aspect of the invention, the method of manufacturing the liquid crystal display device according to the third aspect may be that, the second panel is a light transmissive substrate.

In a fifth aspect of the invention, the method of manufacturing the liquid crystal display device according to the third aspect may be that, the second panel is a touch panel.

In a sixth aspect of the invention, the method of manufacturing the liquid crystal display device according to the fifth aspect may be that, the touch panel is prepared in a state where a light transmissive substrate is overlapped with a surface opposite to the surface on which the polarizing plate is provided.

In a seventh aspect of the invention, the method of manufacturing the liquid crystal display device according to the sixth aspect may be that, a film which is formed of resin is interposed between the touch panel and the light transmissive substrate.

In an eighth aspect of the invention, the method of manufacturing the liquid crystal display device according to any one of the first to seventh aspects may be that, in the step of attaching the first panel to the second panel, the entire upper surface of the first panel is arranged at an inner side of a polarizing plate area. With this configuration, it is possible to secure a wide bonding area, since the polarizing plate can be attached to a wide range of the upper surface of the first panel.

In a ninth aspect according to the invention, there is provided a liquid crystal display device including, a liquid crystal display panel; and a parallax barrier liquid crystal panel which is overlapped with the liquid crystal display panel in order to enable a naked-eye stereoscopic view by separating a left eye image and a right eye image which are displayed on the liquid crystal display panel, in which the liquid crystal display device is that, the liquid crystal display panel and the parallax barrier liquid crystal panel share one polarizing plate; the liquid crystal display panel includes a first panel and the polarizing plate; the parallax barrier liquid crystal panel includes a second panel and the polarizing plate; the second panel is larger than the first panel; the polarizing plate is larger than the first panel; the entire polarizing plate is attached to the second panel; and the polarizing plate is attached to the first panel through an adhesion layer. According to the invention, since the polarizing plate is larger than the first panel, it is possible to perform the attaching work of the polarizing plate easily.

In a tenth aspect, the liquid crystal display device according to the ninth aspect may be that, the entire first panel is arranged in an inner area of the polarizing plate. In this manner, it is possible to attach the polarizing plate to a wide range of the first panel, and to secure a wide bonding area.

In an eleventh aspect, a liquid crystal display device according to the invention may include, a first panel having a liquid crystal layer for controlling passage and block of light; a second panel to which a polarizing plate which is larger than the first panel is attached on one surface thereof; and an adhesive which attaches the polarizing plate of the second panel onto an upper surface of the first panel.

In a twelfth aspect, the liquid crystal display device according to the eleventh aspect may be that, the first panel is a part of a liquid crystal display panel which is formed by interposing the liquid crystal layer between a TFT substrate including a thin film transistor and a color filter substrate including a color filter, and the second panel is apart of a parallax barrier liquid crystal panel which enables a naked-eye stereoscopic view by separating a left eye image and a right eye image which are displayed on the liquid crystal display panel.

In a thirteenth aspect, the liquid crystal display device according to the eleventh aspect may be that, a third panel which is overlapped with a lower surface of the first panel which is opposite to the upper surface onto which the second panel is attached is further included; one of the first panel and the third panel is a part of a liquid crystal display panel which is formed by interposing the liquid crystal layer between a TFT substrate including a thin film transistor and a color filter substrate including a color filter; and the other of the first panel and the third panel is a part of a parallax barrier liquid crystal panel which enables a naked-eye stereoscopic view by separating a left eye image and a right eye image which are displayed on the liquid crystal display panel.

In a fourteenth aspect, the liquid crystal display device according to the thirteenth aspect may be that, the second panel is a light transmissive substrate.

In a fifteenth aspect, the liquid crystal display device according to the thirteenth aspect may be that, the second panel is a touch panel.

In a sixteenth aspect, the liquid crystal display device according to the fifteenth aspect may further include a light transmissive substrate which is overlapped with a surface of the touch panel opposite to the surface onto which the polarizing plate is provided.

In a seventeenth aspect, the liquid crystal display device according to the sixteenth aspect may further include a film which is formed of resin interposing between the touch panel and the light transmissive substrate.

BRIEF DESCRIPTION OF THE DRAWINGS

FIG. 3 is a plan view which shows a liquid crystal display panel.

FIG. 4 is a plan view which shows a parallax barrier liquid crystal panel.

FIG. 5 is a diagram which describes a method of manufacturing the liquid crystal display device according to the first embodiment of the invention.

DETAILED DESCRIPTION OF THE INVENTION

Hereinafter, the embodiments of the invention will be described with reference to the drawings.

First Embodiment

Figure 1:
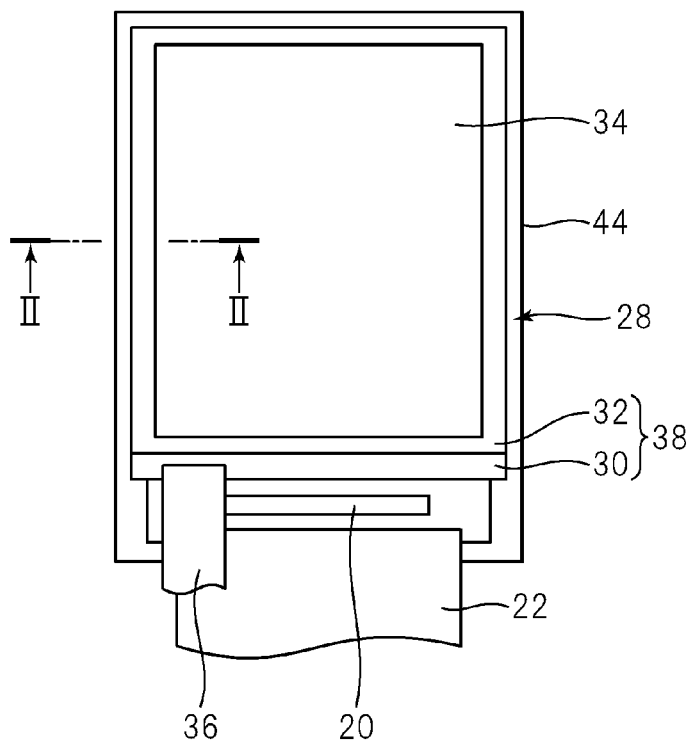
FIG. 1 is a plan view which shows a liquid crystal display device according to a first embodiment of the invention.
Figure 2:
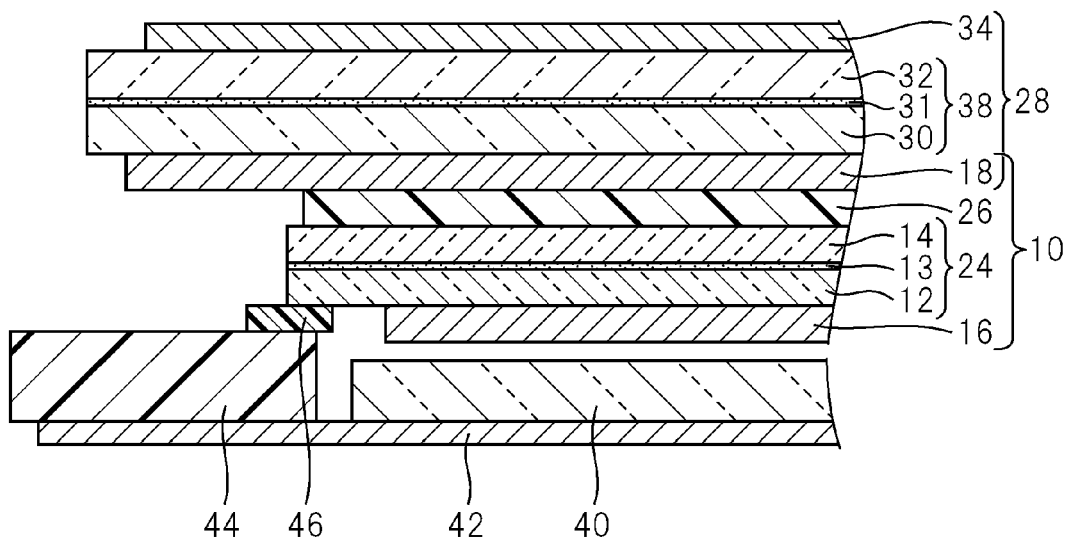
FIG. 2 is a cross-sectional view of the liquid crystal display device which is taken along line II-II in FIG. 1.

FIG. 1 is a plan view which shows a liquid crystal display device according to a first embodiment of the invention, and is a plan view which is viewed from a screen viewer side. FIG. 2 is a cross-sectional view of the liquid crystal display device which is taken along line II-II in FIG. 1. In the embodiment, the viewer side is defined as an upper side, and a direction which is away from the viewer is defined as a lower side. In FIG. 2, a reflective film 42 is arranged on the lowest side.

The liquid crystal display device includes a liquid crystal display panel 10. FIG. 3 is a plan view which shows the liquid crystal display panel 10. The liquid crystal display panel 10 may be a TN (Twisted Nematic) type, an STN (Super Twisted Nematic) type, a VA (Vertical Alignment) system, an IPS (In-Plane Switching) system, or the like, and is not limited to a structure or a type thereof. The liquid crystal display panel 10 has a pair of substrates 12 and 14 which are formed of glass or the like, and are transparent, and a liquid crystal layer 13 for controlling the passage and blocking of light is interposed between the substrates 12 and 14. One substrate 12 is a TFT (Thin Film Transistor) substrate, and a thin film transistor TFT is formed on the substrate 12. The other substrate 14 is a color filter substrate, and a color filter enabling the liquid crystal display device to display in color is formed on the substrate 14. A lower polarizing plate 16 and an intermediate polarizing plate 18 are respectively attached to surfaces of the pair of substrates 12 and 14 which are opposite to each other so as to interpose the substrates 12 and 14 therebetween. An integrated circuit chip 20 is mounted onto the substrate 12, and a flexible wire substrate 22 is attached thereto. The flexible wire substrate 22 includes a wiring pattern which is not shown.

The liquid crystal panel 10 includes a first panel 24 with the liquid crystal layer 13 for controlling the passage and blocking of the light, the lower polarizing plate 16, and the intermediate polarizing plate 18. The lower polarizing plate 16, and the intermediate polarizing plate 18 are attached to both surfaces of the first panel 24. The lower polarizing plate 16 is attached to one surface (lower surface) of the first panel 24, and the intermediate polarizing plate 18 is attached to the other surface (upper surface) of the first panel 24. The lower polarizing plate 16 is directly attached to the substrate 12 of the first panel 24 using an adhesive which is laminated on the lower polarizing plate 16 in advance. When a second panel 38 and the intermediate polarizing plate 18 are separated, there is no cohesion failure of the adhesive. The intermediate polarizing plate 18 is attached to the first panel 24 through an adhesion layer 26. According to the embodiment, the adhesion layer 26 is formed such that liquid UV curing resin is applied to a lower surface of the intermediate polarizing plate 18, the first panel 24 and the intermediate polarizing plate 18 are laminated, and then the adhesion layer is irradiated with ultraviolet light to be cured. When the first panel 24 and the intermediate polarizing plate 18 are separated, there is a cohesion failure of the adhesion layer 26.

The liquid crystal display device according to the embodiment is able to display a stereoscopic image. Specifically, different two-dimensional images are recognized in left and right eyes of a viewer, and then a three-dimensional space is constructed by a viewer' brain on the basis of the two two-dimensional images. For this reason, a left eye image and a right eye image are displayed on the liquid crystal display panel 10.

The liquid crystal display device includes a parallax barrier liquid crystal panel 28. FIG. 4 is a plan view which shows the parallax barrier liquid crystal panel 28. The parallax barrier liquid crystal panel 28 is a panel enabling a naked-eye stereoscopic view by separating the left eye image and the right eye image which are displayed on the liquid crystal display panel 10 using a parallax barrier system. The parallax barrier system is a system in which only the left eye image is viewed in the left eye, and only the right eye image is viewed in the right eye, by overlapping a vertically striped filter (parallax barrier) with a display surface of the image.

The parallax barrier liquid crystal panel 28 may also be the TN (Twisted Nematic) type, the STN (Super Twisted Nematic) type, the VA (Vertical Alignment) system, the IPS (In-Plane Switching) system, or the like, and is not limited to a structure or a type thereof. The parallax barrier liquid crystal panel 28 also includes a pair of substrates 30 and 32 which are formed of glass or the like, and are transparent, and a liquid crystal layer 31 is interposed therebetween. In the embodiment, a transparent electrode (for example, an electrode formed of Indium Tin Oxide) which drives the liquid crystal layer 31 for blocking the light is formed on both the substrates configuring the parallax barrier liquid crystal panel. The parallax barrier liquid crystal panel does not need the TFT (Thin Film Transistor) or the color filter, since the parallax barrier liquid crystal panel is acceptable as long as a vertically striped barrier is formed. However, a display panel which is used in mobile devices may be provided with the thin film transistor as necessary, since the display panel is able to perform a vertical and horizontal display switching. The intermediate polarizing plate 18 and an upper polarizing plate 34 are respectively attached to surfaces of the pair of substrates 30 and 32 which are opposite to each other, so as to interpose the substrates 30 and 32 therebetween. A flexible wire substrate 36 is attached to the substrate 30. The flexible wire substrate 36 has a wiring pattern which is not shown.

The parallax barrier liquid crystal panel 28 includes the second panel 38, the intermediate polarizing plate 18, and the upper polarizing plate 34. The second panel 38 is larger than the first panel 24. The intermediate polarizing plate 18 and the upper polarizing plate 34 are attached to both surfaces of the second panel 38. The intermediate polarizing plate 18 is attached to one surface (lower surface) of the second panel 38, and the upper polarizing plate 34 is attached to the other surface (upper surface) of the second panel 38. Both the intermediate polarizing plate 18 and the upper polarizing plate 34 are directly attached to the substrates 30 and 32 of the second panel 38, using an adhesive which is laminated on the intermediate polarizing plate 18 and the upper polarizing plate 34 in advance.

The intermediate polarizing plate 18 is interposed between the first panel 24 and the second panel 38, and is shared by the liquid crystal display panel 10 and the parallax barrier liquid crystal panel 28. The intermediate polarizing plate 18 is larger than the first panel 24. In addition, according to the embodiment, the intermediate polarizing plate 18 is arranged so as to protrude from a surface of the first panel 24 where the first panel 24 faces the second panel 38 between the first panel 24 and the second panel 38. Accordingly, since an end portion of the intermediate polarizing plate 18 is positioned at the outer side of the first panel 24, even if the end portion of the intermediate polarizing plate 18 is separated from the second panel 38, it does not influence image display of the liquid crystal display panel 10. In addition, the intermediate polarizing plate 18 and the upper polarizing plate 34 are smaller than the second panel 38. With this configuration, it is possible to use side surfaces of the first panel 24 and the second panel 38 for position aligning, when attaching the first panel 24 to the parallax barrier liquid crystal panel 28 including the intermediate polarizing plate 18.

The entire intermediate polarizing plate 18 is attached to the second panel 38. On the contrary, the entire first panel 24 is arranged inside the intermediate polarizing plate 18. Due to this, the intermediate polarizing plate 18 is attached to the first panel 24 in a wide range (the entire range is also preferable), accordingly, it is possible to secure a wide bonding area. In addition, the intermediate polarizing plate 18 is not necessarily larger than the first panel 24, when displaying images. It is acceptable for the intermediate polarizing plate 18 to cover at least an image display area.

As shown in FIG. 2, a light guide plate 40 is arranged so as to overlap with the liquid crystal display panel 10. The light guide plate 40 is assumed to convert light which is input from point light source (not shown) to surface light source. The reflective film 42 is arranged at a side opposite to the liquid crystal display panel 10 of the light guide plate 40, and is assumed to reflect light which is emitted to a lower side (a side opposite to the liquid crystal display panel 10) from the light guide plate 40, and to return to the light guide plate 40. A backlight is configured by adding a light source, optical film, or the like, which are not shown, to the light guide plate 40 and the reflective film 42. The liquid crystal display panel 10 is supported by a frame 44 which is formed by performing resin molding. The liquid crystal display panel 10 and the frame 44 are fixed using a double sided tape 46.

FIG. 5 is a diagram which describes a manufacturing method of the liquid crystal display device according to the first embodiment of the invention. According to the embodiment, at least the first panel 24 before attaching the intermediate polarizing plate 18 on the upper surface is prepared, in order to configure the liquid crystal display device 10. The lower polarizing plate 16 may be attached to the lower surface of the first panel 24, or the first panel 24 before attaching the lower polarizing plate 16 may be prepared. If the lower polarizing plate 16 is attached to the first panel 24, it is possible to prevent the surface onto which the lower polarizing plate 16 is attached (a surface of the substrate 12) from being damaged.

In addition, the second panel 38 is prepared. The second panel 38 is prepared in a state where the intermediate polarizing plate 18 is present at least the one surface of the second panel. As shown in FIG. 5, the intermediate polarizing plate 18 and the upper polarizing plate 34 may be attached to the both surfaces of the second panel. The surface (a surface of the substrate 30) onto which the intermediate polarizing plate 18 is attached is protected from damage due to the intermediate polarizing plate 18. In addition, the second panel 38 is larger than the first panel 24, and the intermediate polarizing plate 18 is also larger than the first panel 24.

In addition, an adhesive 48 is interposed between the upper surface (a side opposite to the lower polarizing plate 16) of the first panel 24 and the intermediate polarizing plate 18 of the second panel 38. In an example shown in FIG. 5, the adhesive 48 is provided in the second panel 38, and is arranged on an upper side of the first panel 24. The adhesive 48 is provided in the intermediate polarizing plate 18. In addition, the adhesive 48 may be provided on any one of the first panel 24 and the second panel 38. Further, any one of the first panel 24 and the second panel 38 may be provided on the top in the manufacturing process.

Subsequently, the first panel 24 is attached to the second panel 38 by spreading the adhesive 48, and by making a gap therebetween small. In the example shown in FIG. 5, the second panel 38 which is provided with the adhesive 48 is lowered, or the first panel 24 arranged at a lower side is lifted.

According to the embodiment, the intermediate polarizing plate 18 is larger than the first panel 24. Accordingly, the first panel 24 and the second panel 38 are attached to each other so that the intermediate polarizing plate 18 is protruded from the upper surface of the first panel 24. That is, the entire upper surface of the first panel 24 is arranged inside the intermediate polarizing plate 18.

According to the embodiment, since the maximum outside diameter is occupied by the first panel 24 and the second panel 38, the first panel 24 and the second panel 38 can be used for position aligning of the end portion of the substrate, respectively. Accordingly, it is possible to attach the parallax barrier liquid crystal panel 28 and the first panel 24 by aligning position thereof with high precision. In addition, since the intermediate polarizing plate 18 is larger than the first panel 24, it is possible to perform the attaching work of the intermediate polarizing plate 18 easily. In addition, since it is possible to attach the intermediate polarizing plate 18 to the upper surface of the first panel 24 in a wide range, a wide bonding area can be secured.

The embodiment of the invention is summarized as follows.

One embodiment of the invention is a method of manufacturing a liquid crystal display device with a parallax barrier. First, the first panel 24 with the liquid crystal layer 13 which is interposed between the TFT substrate and the color filter substrate is prepared. Next, the second panel 38 for forming the parallax barrier liquid crystal panel 28 which separates the left eye image and the right eye image is prepared. At this time, the second panel 38 is larger than the first panel 24, and has the intermediate polarizing plate 18 which is larger than the first panel 24 on the one surface thereof. In addition, the process for preparing the first panel 24 and the process for preparing the second panel 38 may be performed in parallel. Subsequently, the adhesive is interposed between the upper surface of the first panel 24 and the intermediate polarizing plate 18 of the second panel 38. Next, the gap between the first panel 24 and the second panel 38 is made small, and the adhesive is spread to attach the panels to each other. In addition, in the process of attaching the first panel 24 and the second panel 38 to each other, the entire upper surface of the first panel 24 may be arranged inside an area of the intermediate polarizing plate 18.

The liquid crystal display device according to the embodiment of the invention further includes the liquid crystal display panel 10, and the parallax barrier liquid crystal panel 28 which is overlapped with the liquid crystal display panel 10. The liquid crystal display panel 10, and the parallax barrier liquid crystal panel 28 share one intermediate polarizing plate 18. The liquid crystal display panel 10 includes the first panel 24 and the intermediate polarizing plate 18, and the parallax barrier liquid crystal panel 28 includes the second panel 38 and the above described intermediate polarizing plate 18. Further, the second panel 38 is larger than the first panel 24, and the intermediate polarizing plate 18 is larger than the first panel 24. In addition, the second panel 38 is attached with the entire intermediate polarizing plate 18, and the first panel 24 is attached with the intermediate polarizing plate 18 through the adhesion layer 26. In addition, the entire first panel 24 may be arranged in the area inside the intermediate polarizing plate 18.

In the embodiment, the second panel 38 is prepared so as to configure a part of the parallax barrier liquid crystal panel 28, however, a liquid crystal lens panel, or a light transmissive substrate may be prepared, instead of such a second panel 38. When a liquid crystal panel is not used for the second panel 38, the intermediate polarizing plate 18 is used only as the upper polarizing plate of the first panel 24. For example, when the light transmissive substrate to be described later is used in the second panel 38, first, the intermediate polarizing plate 18 which is larger than the first panel 24 is attached to the light transmissive substrate, and then the first panel 24, and the intermediate polarizing plate 18 which is attached to the light transmissive substrate are attached to each other.

Further, according to the embodiment, the first panel 24 which is the liquid crystal panel is used as the display panel, however, even in a case where an organic electroluminescence panel is used as the display panel, and the first panel 24 is used as a part of the parallax barrier liquid crystal panel, the invention is applicable.

Second Embodiment

Figure 6:
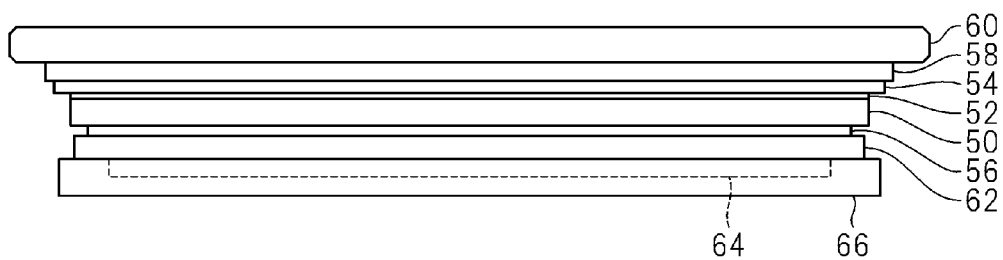
FIG. 6 is a diagram which describes a liquid crystal display device according to a second embodiment of the invention.

FIG. 6 is a diagram which describes a liquid crystal display device according to a second embodiment of the invention.

The liquid crystal display device includes a first panel 50 having a liquid crystal layer (not shown) for controlling passage and blocking of light. An upper polarizing plate 54 is attached to an upper surface of the first panel 50 through an adhesive 52. The upper polarizing plate 54 is larger than the first panel 50. An intermediate polarizing plate 56 is attached to a lower surface of the first panel 50. The first panel 50 to which the upper polarizing plate 54 and the intermediate polarizing plate 56 are attached configures a parallax barrier liquid crystal panel.

A second panel 58 is attached onto the upper polarizing plate 54. The second panel 58 is a touch panel. A light transmissive substrate 60 is attached onto the second panel 58 (a side opposite to the upper polarizing plate 54). The light transmissive substrate 60 takes a role of a reinforcing plate, and is referred to as a front window.

A third panel 62 is overlappingly arranged under the intermediate polarizing plate 56 which is attached to the first panel 50. A lower polarizing plate 64 is attached to a lower side (a side opposite to the intermediate polarizing plate 56) of the third panel 62. The third panel 62 to which the intermediate polarizing plate 56 and the lower polarizing plate 64 are attached configures a liquid crystal display panel which is formed by interposing a liquid crystal layer between a TFT substrate including a thin film transistor and a color filter substrate including a color filter. A backlight 66 is arranged at a lower side of the liquid crystal display panel.

In addition, as a modified example, the first panel 50 may be a part of the liquid crystal display panel, and the third panel 62 may be a part of the parallax barrier liquid crystal panel.

In a manufacturing process of the liquid crystal display device according to the embodiment, the first panel 50 is prepared in a state where the third panel 62 is overlapped therewith. Specifically, the third panel 62 is overlapped with the lower surface of the first panel 50 which is opposite to the upper surface to which the second panel 58 is attached. In addition, the second panel 58 is prepared in a state where the light transmissive substrate 60 is overlapped with a surface opposite to a surface onto which the upper polarizing plate 54 is provided.

In addition, the adhesive 52 is interposed between the upper surface of the first panel 50 and the upper polarizing plate 54 which is attached to the second panel 58, and the first panel 50 and the second panel 58 are attached to each other by making a gap therebetween small, and by spreading the adhesive 52. The content which is described for the adhesive 48 shown in FIG. 5 corresponds to the adhesive 52. The other details correspond to the content which is described in the first embodiment.

Third Embodiment

Figure 7:
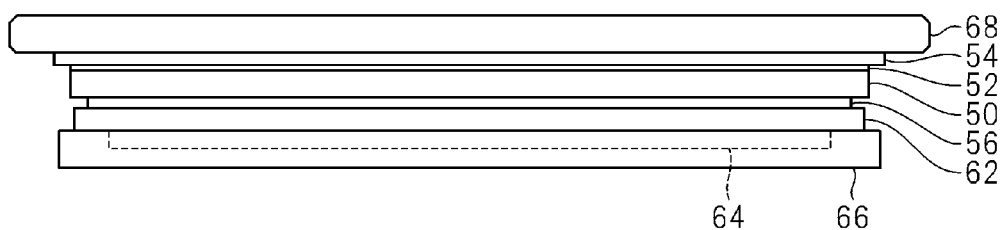
FIG. 7 is a diagram which describes a liquid crystal display device according to a third embodiment of the invention.

FIG. 7 is a diagram which describes a liquid crystal display device according to a third embodiment. In the example, a second panel 68 is a light transmissive substrate. The other details correspond to the content which is described in the above described second embodiment of the invention.

Fourth Embodiment

Figure 8:
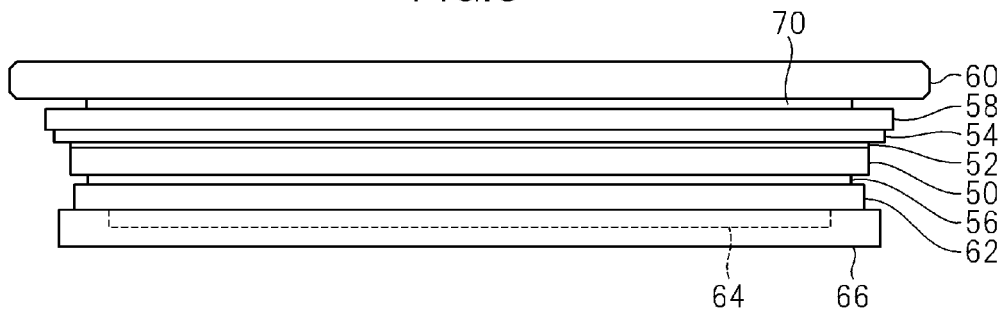
FIG. 8 is a diagram which describes a liquid crystal display device according to a fourth embodiment of the invention.

FIG. 8 is a diagram which describes a liquid crystal display device according to a fourth embodiment of the invention. In the example, a film 70 which is formed of resin is interposed between a second panel 58 as a touch panel and a light transmissive substrate 60. The film 70 is used as a spacer which secures a gap between the second panel 58 and the light transmissive substrate 60. When preparing the second panel 58 by attaching an upper polarizing plate 54 on one surface of the second panel 58, the film 70 is attached to the other surface as well, thereby preventing the second panel 58 from warping. The other details correspond to the content which is described in the above described second embodiment.

The invention is not limited to the above described embodiments, and various modifications are available. For example, the configuration which is described in the embodiments can be substituted to a configuration which is substantially the same, a configuration which represents the same operation effect, or a configuration which can obtain the same object.

What is claimed is:

1. A method of manufacturing a liquid crystal display device comprising:
    preparing a first panel having a liquid crystal layer for controlling passage and block of light;
    preparing a second panel to which a polarizing plate which is larger than the first panel is attached on one surface thereof;
    interposing an adhesive between an upper surface of the first panel and the polarizing plate of the second panel; and
    attaching the first panel to the second panel via the polarizing plate by making a gap therebetween small and by spreading the adhesive;
    wherein in the step of attaching the first panel to the second panel, an entire circumference of the upper surface of the first panel is positioned at an inner area of the polarizing plate.

2. The method of manufacturing the liquid crystal display device according to claim 1,
    wherein the first panel is a part of a liquid crystal display panel which is formed by interposing the liquid crystal layer between a TFT substrate including a thin film transistor and a color filter substrate including a color filter, and
    wherein the second panel is a part of a parallax barrier liquid crystal panel which enables a naked-eye stereoscopic view by separating a left eye image and a right eye image which are displayed on the liquid crystal display panel.

3. The method of manufacturing the liquid crystal display device according to claim 1,
    wherein the first panel is prepared in a state where a third panel is overlapped with a lower surface opposite to the upper surface on which the second panel is attached;
    wherein one of the first panel and the third panel is a part of a liquid crystal display panel which is formed by interposing the liquid crystal layer between a TFT substrate including a thin film transistor and a color filter substrate including a color filter; and
    wherein the other of the first panel and the third panel is a part of a parallax barrier liquid crystal panel which enables a naked-eye stereoscopic view by separating a left eye image and a right eye image which are displayed on the liquid crystal display panel.

4. The method of manufacturing the liquid crystal display device according to claim 3,
    wherein the second panel is a light transmissive substrate.

5. The method of manufacturing the liquid crystal display device according to claim 3,
    wherein the second panel is a touch panel.

6. The method of manufacturing the liquid crystal display device according to claim 5,
    wherein the touch panel is prepared in a state where a light transmissive substrate is overlapped with a surface opposite to the surface on which the polarizing plate is provided.

7. The method of manufacturing the liquid crystal display device according claim 6,
    wherein a film which is formed of resin is interposed between the touch panel and the light transmissive substrate.

8. A liquid crystal display device comprising:
    a liquid crystal display panel; and
    a parallax barrier liquid crystal panel which is overlapped with the liquid crystal display panel in order to enable a naked-eye stereoscopic view by separating a left eye image and a right eye image which are displayed on the liquid crystal display panel,
    wherein the liquid crystal display panel and the parallax barrier liquid crystal panel share one polarizing plate,
    wherein the liquid crystal display panel includes a first panel and the one polarizing plate,
    wherein the parallax barrier liquid crystal panel includes a second panel and the one polarizing plate,
    wherein the second panel is larger than the first panel,
    wherein the one polarizing plate is larger than the first panel,
    wherein the entire one polarizing plate is attached to the second panel,
    wherein the one polarizing plate is attached to the first panel through an adhesion layer, and
    wherein an entire circumference of the first panel is positioned at an inner area of the one polarizing plate.

9. A liquid crystal display device comprising:
    a first panel having a liquid crystal layer for controlling passage and block of light;
    a second panel to which a polarizing plate which is larger than the first panel is attached on one surface thereof; and
    an adhesive which attaches the polarizing plate of the second panel onto an upper surface of the first panel, wherein an entire circumference of the first panel is positioned at an inner area of the polarizing plate.

10. The liquid crystal display device according to claim 9, wherein the first panel is a part of a liquid crystal display panel which is formed by interposing the liquid crystal layer between a TFT substrate including a thin film transistor and a color filter substrate including a color filter, and wherein the second panel is a part of a parallax barrier liquid crystal panel which enables a naked-eye stereoscopic view by separating a left eye image and a right eye image which are displayed on the liquid crystal display panel.

11. The liquid crystal display device according to claim 9, wherein a third panel which is overlapped with a lower surface of the first panel which is opposite to the upper surface onto which the second panel is attached is further included, wherein one of the first panel and the third panel is a part of a liquid crystal display panel which is formed by interposing the liquid crystal layer between a TFT substrate including a thin film transistor and a color filter substrate including a color filter, and wherein the other of the first panel and the third panel is a part of a parallax barrier liquid crystal panel which enables a naked-eye stereoscopic view by separating a left eye image and a right eye image which are displayed on the liquid crystal display panel.

12. The liquid crystal display device according to claim 11, wherein the second panel is a light transmissive substrate.

13. The liquid crystal display device according to claim 11, wherein the second panel is a touch panel.

14. The liquid crystal display device according to claim 13, further comprising:
   a light transmissive substrate which is overlapped with a surface of the touch panel opposite to the surface onto which the polarizing plate is provided.

15. The liquid crystal display device according to claim 14, further comprising:
   a film which is formed of resin interposing between the touch panel and the light transmissive substrate.

16. The method of manufacturing the liquid crystal display device according to claim 1,
   wherein the entire circumference of the upper surface of the first panel delimits an area which is smaller than an area of a surface of the polarizing plate which faces the upper surface of the first panel so that the entire circumference of the upper surface of the front panel is positioned at an inner area of the facing surface of the polarizing plate.

17. A liquid crystal display device according to claim 8, wherein the entire circumference of the first panel delimits an area smaller than an area of a surface of the one polarizing plate which faces a surface of the first panel so that the entire circumference of the upper surface of the front panel is positioned at an inner area of the facing surface of the polarizing plate.

18. A liquid crystal display device according to claim 9, wherein the entire circumference of the upper surface of the first panel delimits an area which is smaller than an area of a surface of the polarizing plate which faces the upper surface of the first panel so that the entire circumference of the upper surface of the front panel is positioned at an inner area of the facing surface of the polarizing plate.

* * * * *